March 15, 1949.    A. M. SASGEN    2,464,655
PRODUCTION OF HEADED RODS
Original Filed April 15, 1943    2 Sheets-Sheet 1
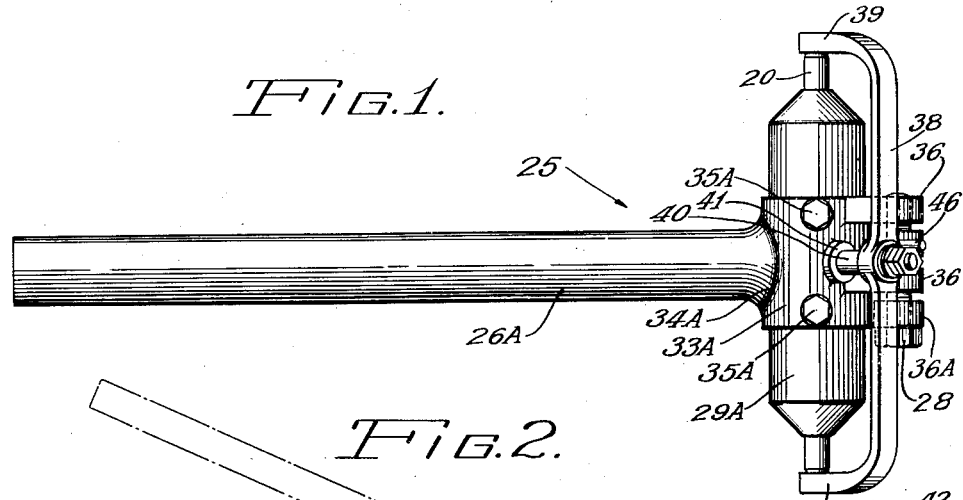
Fig.1.
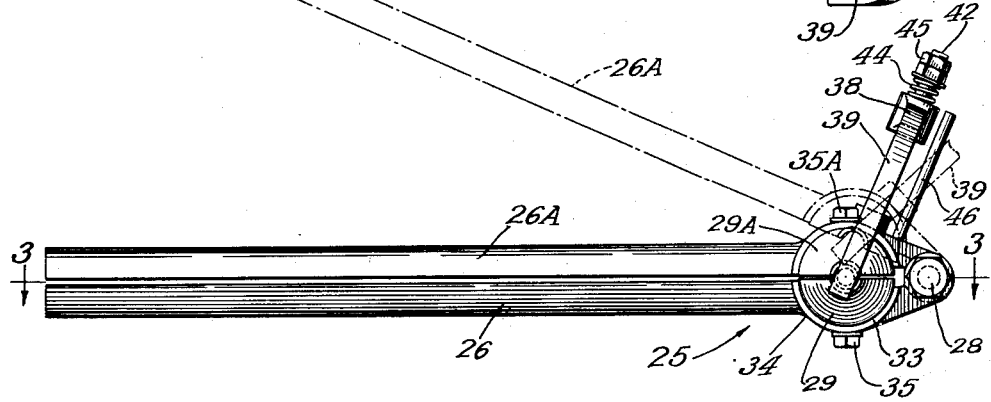
Fig.2.
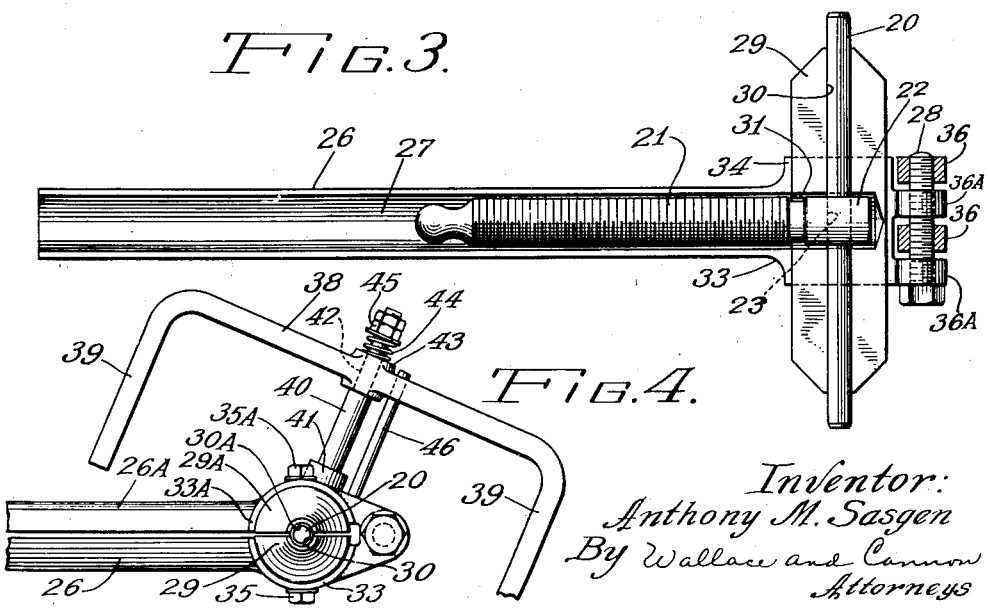
Fig.3.
Fig.4.
Inventor:
Anthony M. Sasgen
By Wallace and Cannon
Attorneys March 15, 1949.  A. M. SASGEN  2,464,655
PRODUCTION OF HEADED RODS
Original Filed April 15, 1943  2 Sheets-Sheet 2
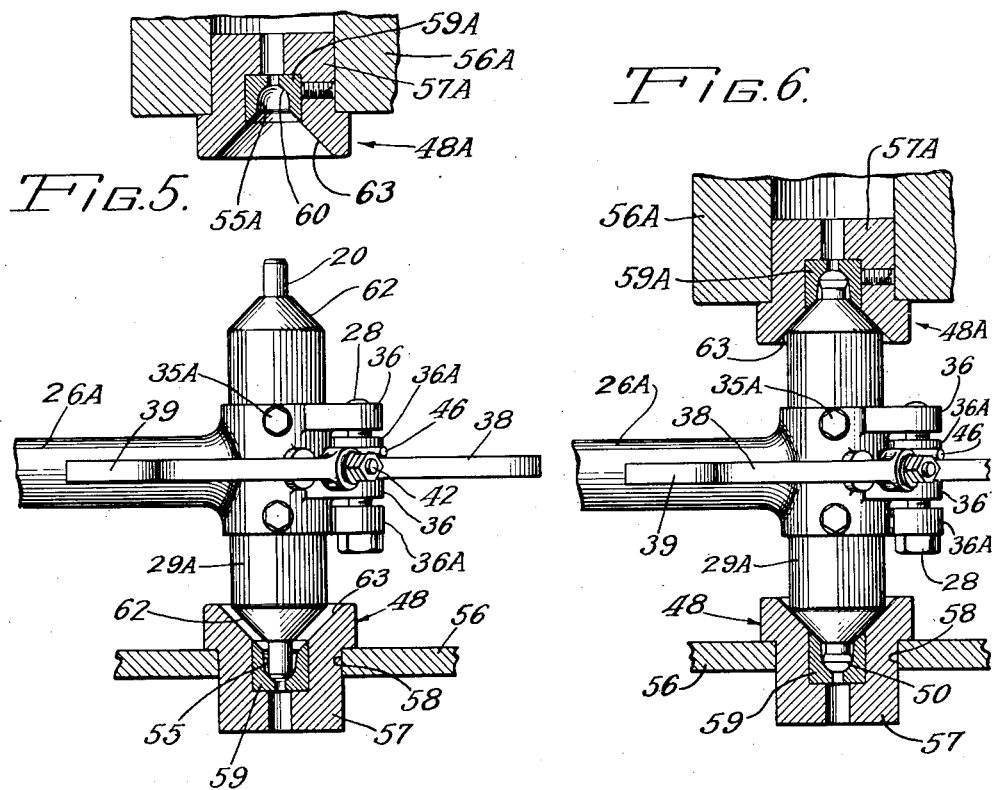
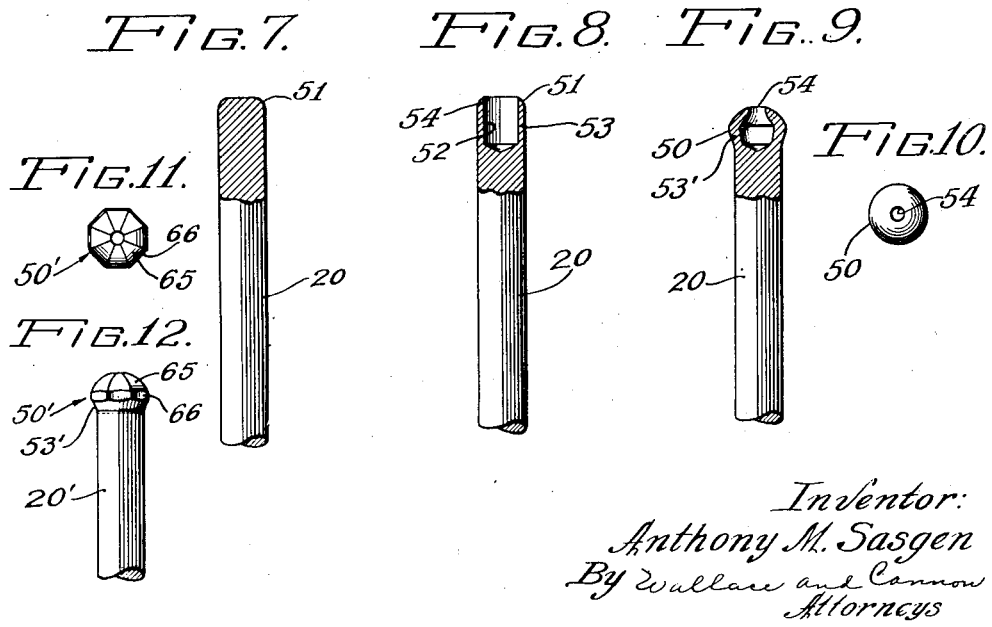
Inventor:
Anthony M. Sasgen
By Wallace and Cannon
Attorneys Patented Mar. 15, 1949

2,464,655

UNITED STATES PATENT OFFICE 2,464,655

PRODUCTION OF HEADED RODS

Anthony M. Sasgen, Chicago, Ill., assignor to Grand Specialties Company, Chicago, Ill., a corporation of Illinois Original application April 15, 1943, Serial No. 483,117. Divided and this application April 12, 1945, Serial No. 587,965

2 Claims. (Cl. 29—148)

This application is a division of my copending application Serial No. 483,117, filed April 15, 1943, now abandoned.

This invention relates to the production of headed rods and particularly to the production of such rods wherein an enlarged head is formed integrally on an end of the rod.

In the manufacturing of clamping devices or vises it is customary to employ a screw threaded member for applying the desired pressure between the jaws of the clamp or vise, and to impart the desired rotative movement to the clamping screw, it is customary to provide a transverse actuating handle which is extended slidably through an extended end of the clamping screw transversely with respect to the axis of the screw. Such an actuating handle is usually in the form of a solid round rod which has enlarged heads thereon at opposite ends thereof to limit the sliding movement of the rod or handle transversely with respect to the axis of the screw.

In the past it has been customary to provide such heads as separately formed ball-shaped members which have been mounted on reduced, shouldered ends of the rods and which have been held in place by peening of the reduced ends of the rod. The production of such heads upon the ends of a rod is relatively expensive and there is always the danger that the peened ends of the rod may have sharp edges which may injure the hands of a workman. In view of the foregoing it is an important object of this invention to enable enlarged heads of a generally ball-like character to be formed on one or both ends of a rod in a simple and expeditious manner, and an object related to the foregoing is to enable such heads to be formed integrally on the ends of such rods.

Where enlarged heads have been provided on rods of the aforesaid character it has usually been customary to mount the heads on the rods and to secure these heads in place on the rods one at a time, and it is a further object of this invention to enable both of the enlarged heads on a rod to be formed in the same operation, and it is a further object to enable such heads to be formed by dies in a machine such as a punch press. A further object of the invention is to form either one or two enlarged heads upon such a rod so as to avoid the production of sharp edges, and a related object is to enable the size, shape and relative location as well as the finish of such heads to be accurately controlled in a simple and effective manner.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a tool or a work holder in which a rod may be supported for the formation of heads on the opposite ends thereof;

Fig. 2 is a plan view of the work holder of Fig. 1;

Fig. 3 is a sectional view of the work holder taken substantially along the line 3—3 of Fig. 2;

Fig. 4 is a bottom plan view generally similar to Fig. 2 and illustrating the work positioning means in its inactive or out-of-the-way position;

Fig. 5 is a side elevational view of the work holder located in position with respect to the forming dies which form the heads on the opposite ends of the rod, the dies being shown in their separated positions;

Fig. 6 is a view similar to Fig. 5 and illustrating the relationship of the dies, the work and the work holder after the formation of the enlarged heads on the ends of the rod;

Fig. 7 is a fragmental side elevational view, partially in section, and illustrating a rod after the first of the forming operations has been performed thereon;

Fig. 8 is a view similar to Fig. 7 and illustrating the form of one end of the rod after the second of the forming operations has been performed;

Fig. 9 is a view similar to Figs. 7 and 8 and illustrating the form of the head after the final forming operation;

Fig. 10 is an end elevational view of the enlarged head after all of the forming operations have been completed;

Fig. 11 is an end elevational view illustrating a modified form of enlarged head which may be formed on one or both ends of the rod under the present invention; and Fig. 12 is a fragmental side elevational view showing the enlarged head in the form illustrated in Fig. 11.

For purposes of disclosure the present invention is herein illustrated as it relates to the formation of heads on the opposite ends of the actuating handle or rod 20 of a screw 21 which is adapted for use in a vise or clamp, but it will be recognized that in at least certain of its aspects, the present invention is adapted for the production of heads on either one or both ends of rods which are to be used for other purposes. The screw 21 has a head 22 thereon in which a transverse bore 23 is formed to slidably receive the actuating handle or rod 20 as shown in Fig. 3 of the drawings, and since heads are to be formed on both ends of the rod 20 at the same time, it will be evident that the rod 20 must be extended through the bore 23 in the screw 21 prior to and during the head-forming operation, and for this purpose a work holder 25 is provided for supporting the rod 20 and the screw 21 while the enlarged heads are formed thereon. In the form herein shown the work holder 25 comprises a pair of handles 26 and 26A which are internally recessed to afford a chamber 27 within which the screw 21 may be located and supported. Preferably such a chamber is afforded by forming the handles 26 and 26A from tubing which has been split into two longitudinal sections and the tubing is of such a size that the screw 21 may be housed therein, the handles 26 and 26A having a pair of cross members 29 and 29A mounted thereon. The cross members 29 and 29A are in the form of segments of a cylinder which have longitudinal recesses 30 and 30A therein to afford clearance space within which a rod 20 may be positioned. The longitudinally extending recesses 30 and 30A are arranged to intersect recesses 31 and 31A which are formed respectively in the cross members 29 and 29A so as to afford a continuation of the chamber 27 formed within and between the handle sections 26 and 26A. Thus the screw 21 may be positioned in the chamber 27 with the head 22 of the screw extended into the chamber extensions formed by the recesses 31 and 31A, and when this is done the rod 20 which has been located in the bore 23 may extend through the clearance space formed by the recesses 30 and 30A. To thus position the screw 21 and the rod 20 in the work holder as just described, the handles 26 and 26A are separated by pivotal movement of the handle 26A to the dotted line position shown in Fig. 2, and after the screw 21 has been rested in position within the handle 26 and with the rod disposed within the recess 30 in the cross member 29, the handle 26A may be returned to its full-line position shown in Fig. 2.

In mounting the cross members 29 and 29A on the handles 26 and 26A, I prefer to utilize a welded construction which builds up a hinge means and provides for convenient securing of the cross members 29 and 29A to the handles. Thus, a band 33 which is adapted to embrace the rounded outer surface of the cross member 29 is welded as at 34 to the handle 26, and the band 33 is secured to the cross member 29 by a plurality of headed screws 35. The band 33 also has a pair of spaced hinge lugs 36 welded thereto at the end opposite from the welded joint 34. A similar band 33A is welded to the handle 26A at 34A and is secured to the cross member 29A by headed screws 35A. The band 34A has hinge lugs 36A welded thereto so that the hinge pin 28 may extend through the hinge lugs 36 and 36A to afford the desired pivoted connection between the two handles 26 and 26A.

When the rod 20 is positioned in the clearance spaces afforded by the recesses 30 and 30A, it is desirable that the rod be initially located so as to project in predetermined and preferably equal amounts from opposite ends of the cross members 29 and 29A, and means are therefore provided for readily attaining such initial location of the rod. As herein shown such means comprise a gauge 38 having arms 39 extended from opposite ends thereof so that these arms may engage opposite ends of the rod 20. The gauge 38, in the present instance, is mounted on the handle 26A for movement from an active position to an inactive or out-of-the-way position. Preferably such mounting is pivotal in character and is afforded by a mounting stud 40 which is extended from a pad 41 welded to the band 33A. The outer end of the stud 40 is reduced and shouldered, as indicated at 42 in Fig. 4 of the drawings, and a centrally bored bearing 43 formed on the gauge 38 intermediate its ends is mounted on the reduced end 42 of the stud 40. A spring 44 surrounds the reduced end 42 and is placed under tension by means including nuts 45 threaded onto the end 42 so that the spring 44 acts to hold the bearing 43 of the gauge in engagement with the shoulder on the stud 40. When a rod 20 is being mounted or positioned between the cross members 29 and 29A, the gauge 38 is disposed in the active position shown in Figs. 1 and 2 wherein the arms 39 of the gauge are located so as to engage the opposite ends of the rod 20. After the handle 26A has been returned to the full-line position of Fig. 2, the surfaces of the recesses 30 and 30A engage the rod 20 with a sufficient clamping force to prevent undue longitudinal displacement of the rod, and the gauge 38 is then rotated through substantially 90 degrees to the out-of-the-way position illustrated in Figs. 4, 5 and 6, and this position is limited and determined by a stop pin 46 which is extended from the band 33 in such a position as to lie in the path of the gauge 38 when the gauge is rotated.

After a rod 20 has been mounted in the work holder 25, the rod may be positioned and supported by the work holder in position between opposed dies 48 and 48A mounted in a punch press or the like so that heads 50 may be simultaneously formed on opposite ends of the rod 20, and in preparing the rod 20 for the formation of such heads 50 thereon, the opposite ends of the rod are successively shaped to the cross sectional forms shown in Figs. 7 and 8. Thus, the ends of the rod 20 are cut or bevelled to a rounded form, as indicated at 51 in Fig. 7, after which an axial bore 52 is extended into each end of the rod 20. Thus the axial bore 52 serves to afford a relatively thin cylindrical wall 53 which is extended longitudinally from the solid body portion of the rod 20, and by virtue of the rounded corner 51, the end edge portion of the wall 53 is relatively thin as compared with what may be termed the base portion 53' of the wall 53. It will be evident that when headed rods are to be formed in relatively large numbers, the two rounded ends or corners 51 may be simultaneously formed, and it will also be clear that the two bores 53 may also be formed at the same time through the provision of a suitable double-end drilling mechanism, and as a result these operations may be rapidly and economically performed.

After the two ends of the rod have been rounded and bored as aforesaid, the rod 20 is inserted through the transverse bore 23 of the screw 21 upon which the rod 20 is to be mounted, and the screw 21 and the rod 20 are mounted in the work holder 25 in the manner hereinbefore described, the rod 20 being accurately located in an endwise direction through the use of the gauge 38. The gauge 38 is then moved to its out-of-the-way position of Figs. 4 to 6, and the workman maintains the rod 20 in the desired longitudinal position between the cross members 29 and 29A merely by holding the two handles 26 and 26A firmly together. The workman may then position the rod 20 between the two dies 48 and 48A as shown in Fig. 5 of the drawings, the lower end of the rod 20 being rested in the die recess 55 of the die 48. The die 48 is mounted in or on the bed plate 56 of a punch press or the like, and as herein shown each die 48 includes a collared mounting bushing 57 disposed in a mounting opening 58 which is formed in the bed plate 56. The mounting bushing 57 has a hardened die member 59 mounted therein, and it is in the die member 59 that the die recess 55 is formed. The die member 48A is mounted in a downwardly facing relation in the head 56A of the punch press or the like, and the die member 48A also includes a collared retaining bushing 57A and a hardened die member 59A within which the die recess 55A is formed.

As will be evident in Figs. 5 and 6 of the drawings, the die recess 55A is of generally cup-shaped form and it is of a diameter somewhat greater than the diameter of the rod 20. At its inner end the die recess 55A has a rounded surface 60 with which the end edge of the wall 53 may be engaged, and it will be understood that the two die recesses 55 and 55A are substantially similar in form. Thus when the rod 20 is positioned with one of its ends in one of the die recesses 55 or 55A and with the other end aligned with the other of these recesses, and the two dies are moved toward each other, the rounded edges 51 of the walls 53 engage the rounded surfaces 60 of the dies, and the application of endwise pressure to the rod 20 by the dies 48 and 48A causes the end portions of the walls 53 to be forced or formed inwardly toward the axis of the rod 20 with what may be termed a camming action. As this inward forming action takes place the relatively thin edge portion of the wall 53 is in effect reduced in diameter so as to define a relatively small end opening 54. Thus, the end portions of the walls 53 are formed inwardly, and as the approaching movement of the two dies progresses, the dies act upon such inwardly formed end portions of the walls 53 to cause the base portions 53' of the walls 53 to be distended in an outwardly sloping direction as indicated in Fig. 9, thereby to form a generally ball-like head 50 on each end of the rod. During such endwise compression of the rod 20 the intermediate portions of the rod are firmly embraced by the walls of the recesses 30 and 30A, and hence the cross members 29 and 29A serve to prevent bending of the rod 20 during the forming operation.

As such heads 50 are being thus formed, it is essential in most instances that the heads be maintained in a concentric relation with rod 20, and this is accomplished under the present invention through a cooperative centering action and which is attained between the cross members 29 and 29A and the die members 48 and 48A. Thus, as will be evident in Figs. 5 and 6, the ends of the members 29 and 29A are formed to afford conical surfaces 62 which are so spaced that when the forming action of the two dies is nearing completion, these conical surfaces 62 will be engaged with the complemental surfaces of conical recesses 63 which are formed in the die members 48 and 48A concentric with the die recesses 55 and 55A thereof. Hence, upon completion of the approaching or forming movement of the dies 48 and 48A, the cross members 29 and 29A will be disposed in a concentric relation to the die recesses, and as a result the rod 20 will be concentrically located with respect to the die recesses and heads 50 will be formed in the desired concentric relation to the rod. It will be apparent in Figs. 6 and 9 that continued approaching movement of the dies 48 and 48A would cause undue outward flaring of the base portion 53' of each head 50 but this is prevented by engagement of the conical surfaces 62 with the conical recesses 63, for by reason of such engagement, the cross members 29 and 29A act as stops to limit the relative approaching movement of the two forming dies.

While it will be noted that the edge of the wall 53 which defines the end opening 54 appears in Fig. 9 to be somewhat sharp, the size of the opening 54 is so small and the outer surface of the head adjacent the opening is so nearly normal to the axis of the rod that this edge of the opening is, in effect guarded and is not dangerous in the least.

While the heads 50 as disclosed in Figs. 6, 9 and 10 are formed with the outer surfaces in a concentric relation with respect to the axis of the rod 20 and have smooth and unlined surfaces, it will be evident that certain of the external surfaces might under the invention be formed as a series of generally similar facets disposed about the axis of the rod, and a rod 20' is illustrated in Figs. 11 and 12 wherein such a differently shaped head 50' is provided. The head 50' is formed to the desired shape in substantially the same manner as hereinbefore described with relation to the heads 50, the end or ends of the rod which are to be headed being rounded at 51 and bored as at 52 to afford a wall 53 as shown in Fig. 8. The rod 20 is then supported in a work holder as 25 and is positioned between forming dies similar to the dies 48 and 48A, but these dies are formed with facets in the inner surfaces of the die recesses thereof so that as the wall 53 is forced endwise into the die recess the outer surface of the wall is formed with curved facets 65 and flat facets 66 thereon. The outer surface of the base section 53' of the wall 53 is, however, formed in such an instance to substantially the same concentric shape as in Figs. 6 and 9, for this surface does not contact the surfaces of the die recess.

From the foregoing description it will be apparent that the present invention enables one or more heads of generally ball-like form to be produced upon a rod or the like, and under the present invention such heads may be formed integrally upon such rods and this may be accomplished in a simple and expeditious manner. Moreover, it will be evident that where heads are formed upon a rod in accordance with this invention, all danger of sharp edges upon such rods is eliminated. It will also be evident that the present invention provides a novel and convenient work holder for use in the production of the headed rods of this invention and this holder cooperates with the forming dies to issue accuracy of formation of the heads upon the rods.

Hence while I have illustrated and described preferred embodiments of my invention, it is to be understood that these are capable of variation and modification and I therefore do not wish to be limited to the precise details set forth, but desire to avail myself of such changes and altera-

I claim:

1. The method of forming an enlarged head on an end of an elongated rod which consists in rounding the end edges of the end of the rod upon which the head is to be formed, forming a bore axially into said end of the rod upon which the head is to be formed to thereby afford an integral and axially extending wall on said end of the rod, and compressing said wall in an endwise direction while imparting an inward camming force to the end edge of the wall to thereby distend intermediate portions of the wall to form a laterally enlarged head and shape the end portion of the wall to a smooth and inwardly tapered form.

2. The method of forming an enlarged head on one end of an elongated rod so as to afford a head that is larger in its lateral dimension than the rod on which it is formed, which method consists in rounding the end edges of the end of the rod upon which the head is to be formed, forming a bore axially into said end of the rod to thereby afford an integral and axially extending wall on said end of the rod, applying opposing compressive forces to opposite ends of the rod endwise of the rod to thereby compress said wall in an endwise direction, and simultaneously imparting an inward camming force to the end edge of the wall to thereby distend intermediate portions of the wall laterally beyond the adjacent side surfaces of the rod and shape the end portion of the wall to a smooth and inwardly tapered form.

ANTHONY M. SASGEN.

REFERENCES CITED

The following references are of record in the file of this patent:

UNITED STATES PATENTS

| Number | Name | Date |
|---|---|---|
| 1,050,422 | Birchwood | Jan. 14, 1913 |
| 1,098,597 | Taylor | June 2, 1914 |
| 1,568,031 | Wilcox | Dec. 29, 1925 |
| 1,719,243 | Shaff | July 2, 1931 |
| 1,798,738 | Hoern | Mar. 31, 1931 |
| 1,803,803 | Kaufman | May 5, 1931 |
| 1,817,854 | Sorensen | Aug. 4, 1931 |
| 2,080,220 | Butter et al. | May 11, 1937 |
| 2,141,753 | Hufferd et al. | Dec. 27, 1938 |
| 2,182,601 | Venditty | Dec. 5, 1939 |
| 2,265,839 | Hufferd | Dec. 9, 1941 |